(12) United States Patent
Sakamoto

(10) Patent No.: US 8,063,537 B2
(45) Date of Patent: Nov. 22, 2011

(54) LINEAR DRIVE ULTRASONIC MOTOR

(75) Inventor: Tetsuyuki Sakamoto, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 12/910,245

(22) Filed: Oct. 22, 2010

(65) Prior Publication Data

US 2011/0037348 A1 Feb. 17, 2011

Related U.S. Application Data

(63) Continuation of application No. PCT/JP2009/057182, filed on Apr. 8, 2009.

(30) Foreign Application Priority Data

Apr. 24, 2008 (JP) ................................. 2008-114222

(51) Int. Cl.
*H01L 41/08* (2006.01)
(52) U.S. Cl. .................................................. 310/323.02
(58) Field of Classification Search .............. 310/323.02
See application file for complete search history.

(56) References Cited

U.S. PATENT DOCUMENTS 6,218,767 B1 4/2001 Akada et al.

FOREIGN PATENT DOCUMENTS

| JP | 5-184165 | 7/1993 |
|---|---|---|
| JP | 7-312881 | 11/1995 |
| JP | 2000-213537 | 8/2000 |
| JP | 2001-336526 | 12/2001 |
| JP | 3524248 | 2/2004 |

OTHER PUBLICATIONS

International Preliminary Report on Patentability together with the Written Opinion dated Dec. 13, 2010.
Abstract of Japanese Patent Publication No. 09-191670, dated Jul. 22, 1997.
International Search Report dated Jul. 14, 2009.

*Primary Examiner* — Mark Budd
(74) *Attorney, Agent, or Firm* — Scully, Scott, Murphy & Presser, P.C.

(57) ABSTRACT

There is provided a linear drive ultrasonic motor of which, a size can be made small, and in which, it is possible to guide assuredly while reducing a transfer resistance and a frictional resistance of a driven member.
A linear drive ultrasonic motor includes at least, an ultrasonic vibrator having a piezoelectric element, a driven member which is driven by a frictional force between the driven member and the ultrasonic vibrator, a pressing member which presses the ultrasonic vibrator such that a frictional force is generated between the ultrasonic vibrator and the driven member, a rolling member having a spherical shape, which makes a contact with the driven member, and a base member which movably supports the driven member via the rolling member, and the rolling member makes a contact with the driven member at a first contact point, and makes a contact with the base member at two second contact points, and lengths of two straight lines connecting the first contact point and two second contact points are substantially same.

9 Claims, 22 Drawing Sheets

10

10

LINEAR DRIVE ULTRASONIC MOTOR

CROSS-REFERENCE TO RELATED APPLICATIONS

The present application is based upon and claims the benefit of priority from prior Japanese Patent Application No. 2008-114222 filed on Apr. 24, 2008; the entire contents of which is incorporated herein by reference.

TECHNICAL FIELD

The present invention relates to a linear drive ultrasonic motor.

BACKGROUND ART

As a conventional linear drive ultrasonic motor, a vibration apparatus described in Patent Literature 1 can be cited as an example (FIG. 18A and FIG. 18B). Here, FIGS. 18A and 18B are diagrams showing a structure of a conventional linear drive ultrasonic motor, where, FIG. 18A is an exploded perspective view and FIG. 18B is a vertical cross-sectional view.

The vibration apparatus shown in FIG. 18A and FIG. 18B includes a case 906 which accommodates a vibrating body 901, a mobile object 904 which passes through the case 906 and makes a contact with the vibrating body 901, and a pressing spring 905 which generates thrust (bias) which brings the mobile object 904 and the vibrating body 901 in a pressurized contact. The pressing spring 905 is installed at an outer side of the case 906. An opening portion is formed in a side of the case 906, facing the vibrating body 901, and the thrust of the pressing spring 905 acts on the vibrating body 901 through the opening portion. In other words, this vibration apparatus has a structure in which, the pressing spring 905 is installed on the outer side of the case 906 while covering the opening portion of the case 906, and a deformed portion (a flat surface portion covering the opening portion) of the pressing spring 905 which generates the thrust, is exposed.

As in the vibration apparatus described in Patent Literature 1, making a unit structure in which, main structural components are packaged, is effective from a point of generality and stabilizing of characteristics. However, in an ultrasonic motor apparatus, small-sizing, and high output have been sought.
Patent Literature: Japanese Patent No. 3524248 Specification

DISCLOSURE OF THE INVENTION

Problems to be Solved by the Invention

However, in the vibration apparatus described in Patent Literature 1, the structure is such that, the mobile object 904 is guided in a direction of movement and around an axis of the mobile object 904 by a sliding bearing which is provided in a hole of the case 906. In this structure, since the mobile object is pressed against the case 906 by the pressing spring 905, a contact pressure of a contact portion with the sliding bearing provided in the hole of the case 906 is high, and a sliding friction when the mobile object 904 moves is substantial. Therefore, a sliding resistance becomes substantial, and becomes a cause of a decline in output. Moreover, since the mobile object 904 vibrates by the vibrating body 901, there has been a problem that wearing out of a portion subjected to sliding friction accelerates. When the bearing such as a thrust bearing which is normally used for this portion, it leads to an increase in the size of the apparatus. Moreover, in the vibration apparatus of the Patent Literature 1, providing a guide mechanism which guides the mobile object 904 at an interior of the case 906 is difficult from a view point of small-sizing. Furthermore, it is also difficult to form a guiding mechanism having a small frictional resistance while maintaining the small-sizing, at the interior of the case.

The present invention has been made in view of the abovementioned circumstances, and an object of the present invention is to provide a linear drive ultrasonic motor of which, a size can be made small, and in which, it is possible to guide assuredly while reducing a transfer resistance and the frictional resistance of a driven member.

Means for Solving the Problems

To solve the abovementioned problems and to achieve the object, a linear drive ultrasonic motor according to the present invention includes at least
 an ultrasonic vibrator having a piezoelectric element,
 a driven member which is driven by a frictional force between the driven member and the ultrasonic vibrator,
 a pressing member which presses the ultrasonic vibrator such that, a frictional force is generated between the ultrasonic vibrator and the driven member,
 a rolling member having a spherical shape, which makes a contact with the driven member, and
 a base member which movably supports the driven member via the rolling member, and
 the rolling member makes a contact with the driven member at a first contact point, and makes a contact with the base member at two second contact points, and
 lengths of straight lines connecting the first contact point and two second contact points are substantially same.

In the linear drive ultrasonic motor according to the present invention, it is preferable that the driven member has a curved surface within a range in which, at least the first contact point exists.

In the linear drive ultrasonic motor according to the present invention, it is preferable that the rolling member is disposed at a position which is not exactly under the driven member.

In the linear drive ultrasonic motor according to the present invention, it is desirable that the linear drive ultrasonic motor includes a guiding member which includes a plurality of rolling members, and which guides the rolling members in a direction in which the driven member is driven, while maintaining a relative positional relationship of the rolling members.

In the linear drive ultrasonic motor according to the present invention, there can be provided a protruding portion which is lower than a radius of the rolling member, at a bottom surface of the base member.

In the linear drive ultrasonic motor according to the present invention, it is preferable to provide to the base member, a base guiding mechanism which includes a plurality of rolling members, and which guides the rolling members in a direction in which, the driven member is driven, while maintaining a relative positional relationship of the rolling members.

In the linear drive ultrasonic motor according to the present invention, it is preferable that the base member has a flat surface corresponding independently to each of the two second contact points, toward the rolling member.

In the linear drive ultrasonic motor, it is preferable that in the base member, an angle made by adjacent flat surfaces is a right angle.

In the linear drive ultrasonic motor, it is preferable that in the base member, an angle made by adjacent flat surfaces is an obtuse angle.

Effect of the Invention

A linear drive ultrasonic motor according to the present invention shows an effect that it has a structure in which, it is possible to reduce a transfer resistance and a frictional resistance of a driven member while guiding the driven member assuredly, and furthermore, it is possible to maintain and accelerate small-sizing.

Figure 1A:
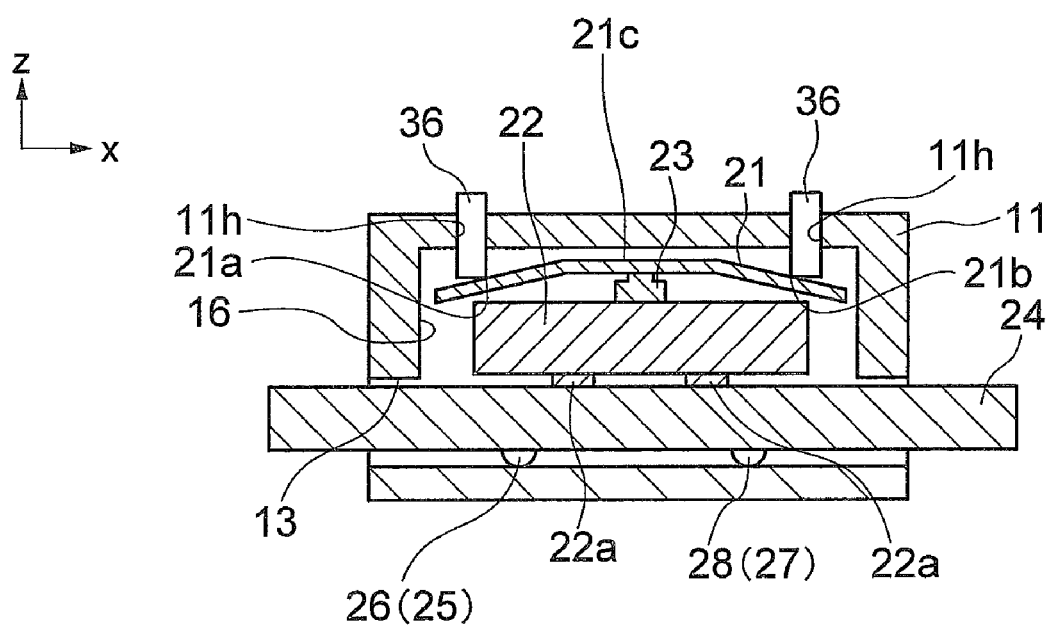
FIG. 1A is a diagram showing a structure of an ultrasonic motor according to a first embodiment of the present invention, and is a cross-sectional view taken along a line IA-IA in FIG. 1B.

DESCRIPTION OF REFERENCE NUMERALS 10 ultrasonic motor (linear drive ultrasonic motor)
11 case member
11*h* screw hole
12 base member
12*a*, 12*c* side surfaces
12*b* bottom surface
13 opening portion
16 accommodating recess
21 pressing member
21*a*, 21*b* end portions
21*c* central portion
22 vibrator (ultrasonic vibrator)
22*a* stator
23 supporting member
24 driven member
24*a* flat surface
24*b* curved surface
25, 26, 27, 28 rolling members
25*a* contact point (first contact point)
25*b*, 25*c* contact points (second contact points)
26*a* contact point (first contact point)
26*b*, 26*c* contact points (second contact points)
36 pressing adjustment screw (pressurizing portion)
40 guiding member
41, 42, 43, 44 notches
124 driven member
124*a* flat surface portion
124*b* curved surface portion
212 base member
212*a*, 212*c* side surfaces
212*b* bottom surface
224 driven member
224*a* flat surface portion
224*b* curved surface portion
212*p* protruding portion
412 base member
412*a*, 412*c* side surfaces
412*b* bottom surface 427a contact point (first contact point)
427b, 427c contact points (second contact points)
428a contact point (first contact point)
428b, 428c contact points (second contact points)
455, 456, 457, 458 notches (base guiding mechanisms)
512 base member
512a, 512c side surfaces
512b bottom surface
527a contact point (first contact point)
527b, 527c contact points (second contact points)
528a contact point (first contact point)
528b, 528c contact points (second contact points)
555, 556, 557, 558 notches (base guiding mechanisms)

BEST MODE FOR CARRYING OUT THE INVENTION

Embodiments of an ultrasonic motor 10 (a linear drive ultrasonic motor) according to the present invention will be described below in detail by referring to the accompanying diagrams. However, the present invention is not restricted to the embodiments described below.

First Embodiment

Figure 1B:
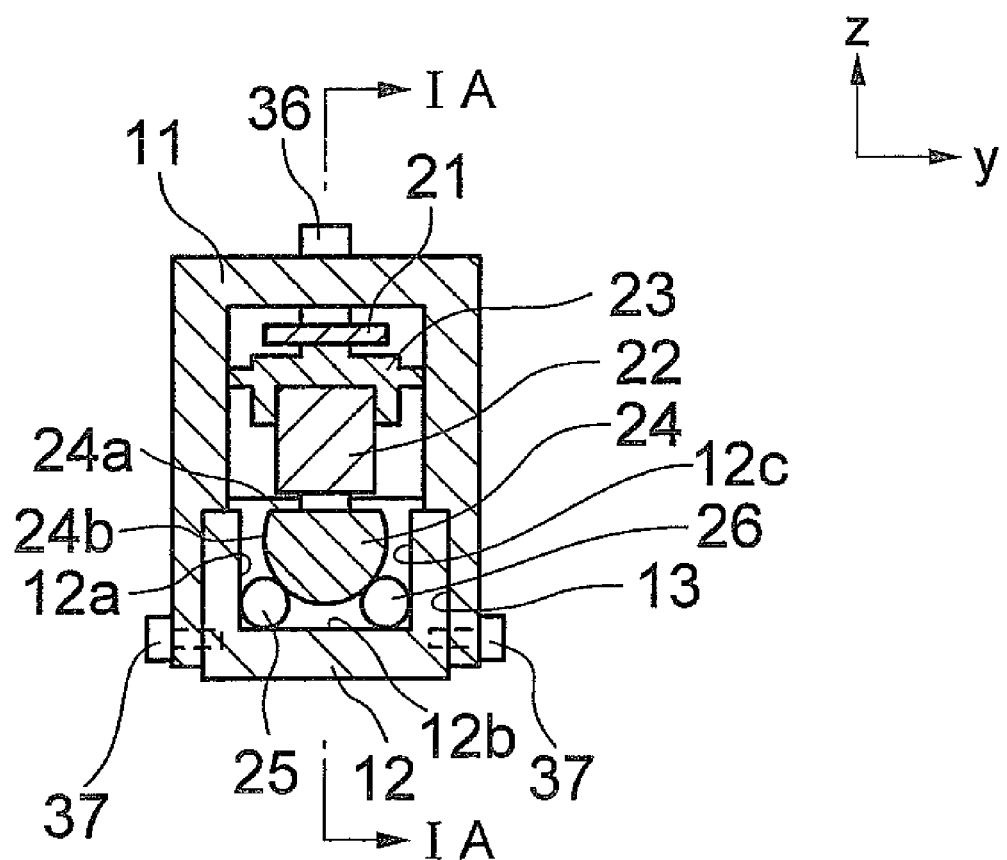
FIG. 1B is a diagram showing a structure of the ultrasonic motor according to the first embodiment of the present invention, and is a cross-sectional view orthogonal to a center in a longitudinal direction of a case member.

The ultrasonic motor 10 (the linear drive ultrasonic motor) according to a first embodiment and modified embodiments thereof will be described below while referring to diagrams from FIG. 1A to FIG. 5. Here, FIG. 1A and FIG. 1B are diagrams showing a structure of the ultrasonic motor 10, where, FIG. 1A is a cross-sectional view taken along a line IA-IA in FIG. 1B, and FIG. 1B is a cross-sectional view orthogonal to a center in a longitudinal direction (x-direction) of a case member 11. As shown in FIG. 1A and FIG. 1B, the ultrasonic motor 10 includes a vibrator 22 as an ultrasonic vibrator, a driven member 24, a pressing member 21, rolling members 25, 26, 27, and 28, the case member 11, and a base member 12. Each member will be described below in detail.

Both the vibrator 22 and the case member 11 have a substantially rectangular parallelepiped outer shape, and an accommodating recess 16 is formed at an interior of the case member 11, which reaches up to an outside from an opening portion 13 which is closed by disposing the base member 12. The vibrator 22 and the pressing member 21 are accommodated in order from a side of the opening portion 13 in a direction of height (z-direction in FIG. 1A) of the ultrasonic motor 10, inside the accommodating recess 16. The pressing member 21 is a plate spring in the form of a long plate, and is disposed such that a longitudinal direction thereof is along a longitudinal direction (x-direction in FIG. 1A) of the ultrasonic motor 10 and the case member 11. The case member 11 can be let to have a shape other than the shape shown in FIG. 1A and FIG. 1B, and moreover, an arrangement in which, the case member 11 does not have an independent form as the case member 11, is also possible.

The pressing member 21 is disposed such that, an upper surface of two end portions 21a and 21b in the longitudinal direction makes a contact with a pressing adjustment screw 36 which is inserted through two screw holes 11h formed in an upper surface of the case member 11, and a lower surface of a central portion 21c makes a contact with a supporting member 23 which is for positioning the vibrator 22. Here, the supporting member 23 is fixed to a center in the longitudinal direction (x-direction in FIG. 1A) of the vibrator 22. Moreover, the vibrator 22 is formed by an ultrasonic vibrator (such as a piezoelectric element). In the following diagrams, electric wires for driving the vibrator 22 are omitted.

The driven member 24 is disposed on the base member 12 via the rolling members 25, 26, 27, and 28 such that, the driven member 24 is movable along the longitudinal direction of the case member 11. The driven member 24 is a member in the form of a shaft having a D-shaped cross-section, with a part of a circular cylinder cut. A flat surface portion 24a of the driven member 24 makes a contact with the vibrator 22 via a stator (a drive element) 22a, and a curved surface portion 24b of the driven member 24 makes a contact with the rolling member 25.

The base member 12 is extended along the longitudinal direction (x-direction) of the ultrasonic motor 10, and a cross-section thereof orthogonal to the longitudinal direction has a shape of an English alphabet U turned counterclockwise through 90 degrees. As shown in FIG. 1B, the rolling members 25, 26, 27, and 28 having a spherical shape make a contact with a bottom surface 12b and side surfaces 12a and 12c of the base member 12. Moreover, the driven member 24 is placed on the rolling members 25, 26, 27, and 28 such that the curved surface 24c and the rolling members 25, 26, 27, and 28 are in mutual contact. Accordingly, the driven member 24 is movable in the longitudinal direction (x-direction, direction of driving) with respect to the base member 12.

The ultrasonic motor 10 is fixed to the base member 12 by a screw 37, in a state of the pressing member 21 and the vibrator 22 accommodated inside the accommodating recess 16 of the case member 11. Thereafter, by adjusting an amount extended of the two pressing adjustment screws 36 which are screwed through the upper surface of the case member 11, inside the accommodating recess 16, front ends of the pressing adjustment screws 36 are bent by pressing both end portions 21a and 21b of the pressing member 21, and a thrust which presses the vibrator 22 against the driven member 24 is generated.

Figure 2:
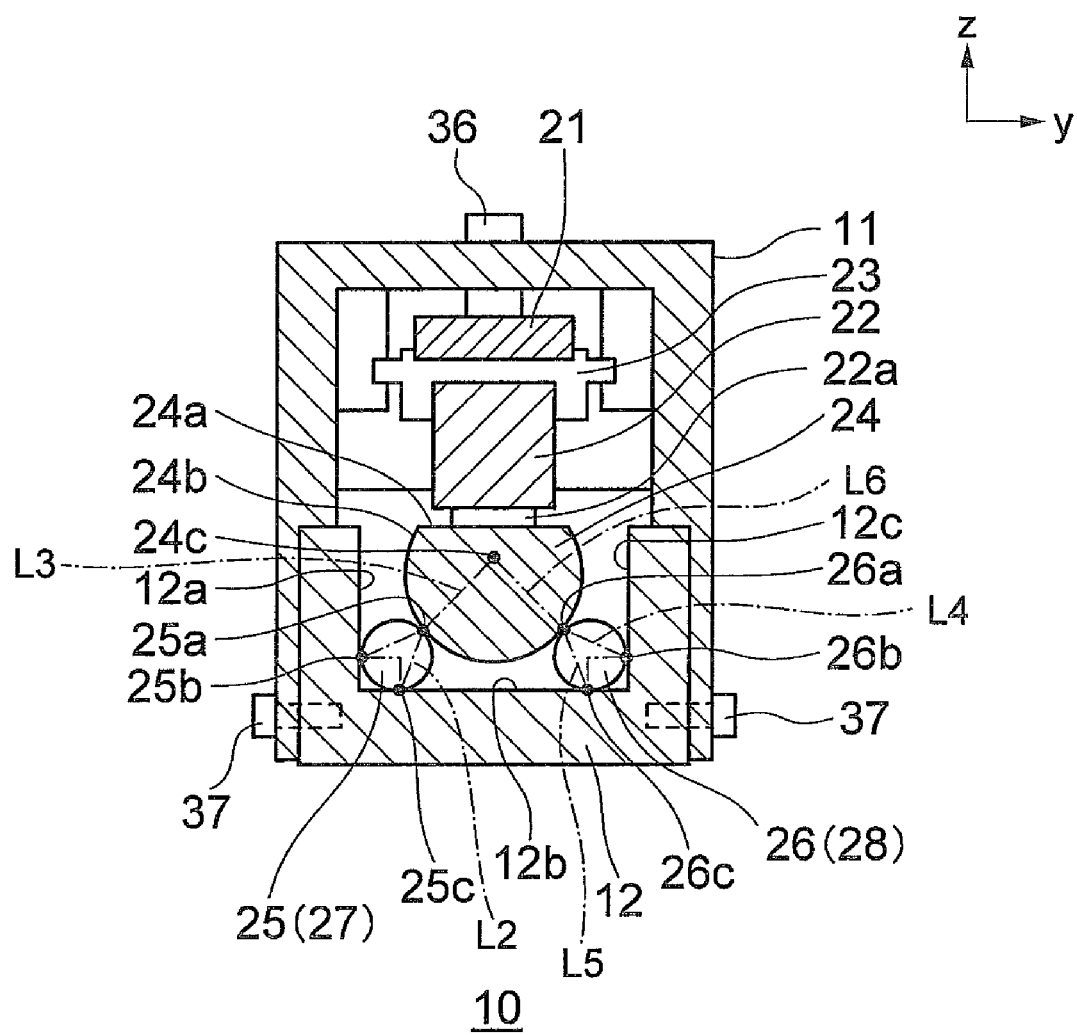
FIG. 2 is a cross-sectional view orthogonal to the center in the longitudinal direction of the case member of the ultrasonic motor according to the first embodiment of the present invention.
Figure 3:
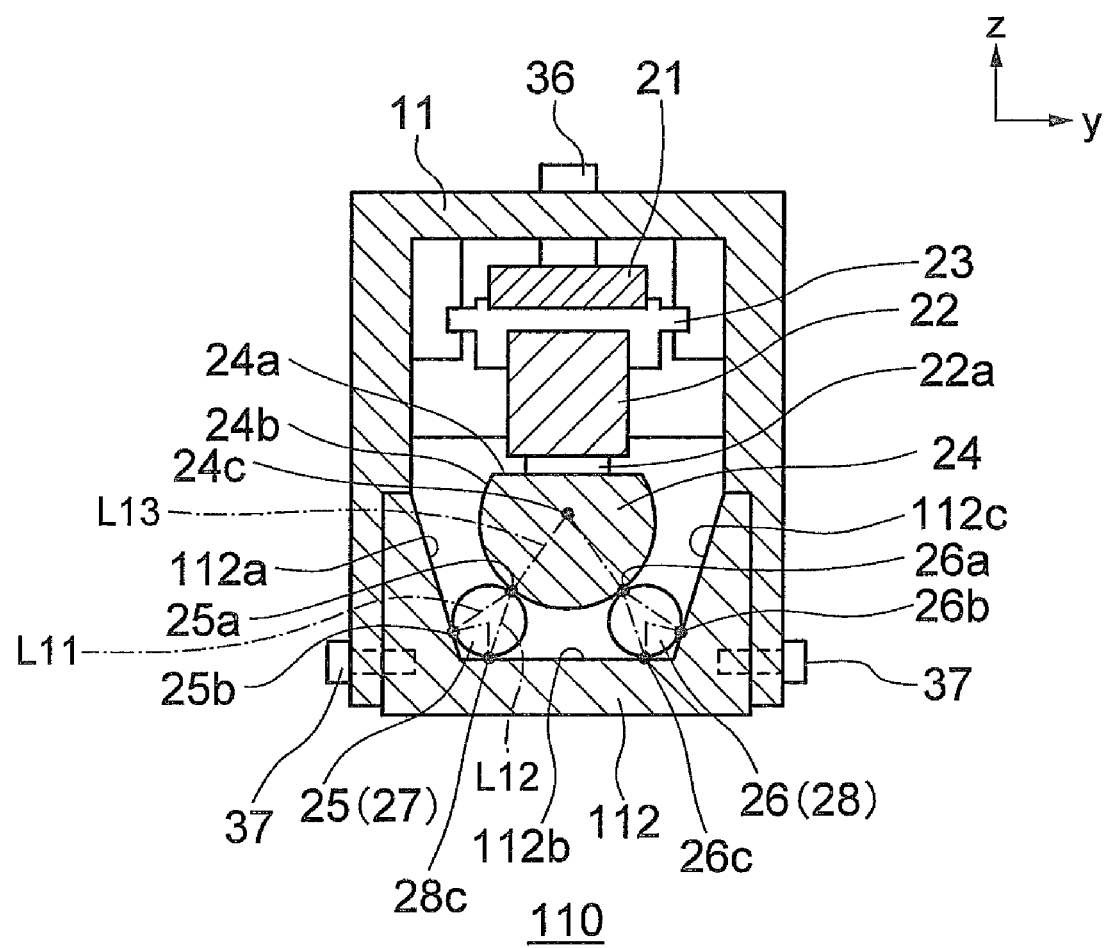
FIG. 3 is a cross-sectional view orthogonal to a center in a longitudinal direction of a case member of an ultrasonic motor according to a first modified embodiment of the first embodiment.

In the ultrasonic motor 10 having such structure, a positional relationship of the base member 12, the rolling members 25, 26, 27, and 28, and the driven member 24 will be described below while referring to FIG. 2 and FIG. 3. All the rolling members 25, 26, 27, and 28 have same outer diameter. Here, FIG. 2 is a cross-sectional view orthogonal to a center in a longitudinal direction (a direction (x-direction) orthogonal to y-direction and z-direction) of the case member 11 of the ultrasonic motor 10, and corresponds to an enlarged view of FIG. 1B. FIG. 3 is a cross-sectional view orthogonal to a center in a longitudinal direction (a direction (x-direction) orthogonal to y-direction and z-direction) of the case member 11 of an ultrasonic motor 110 according to a first modified embodiment of the first embodiment, and is a diagram corresponding to FIG. 2.

As shown in FIG. 2, the base member 12, at an inner side thereof, has a shape such that the side surfaces 12a and 12c which are face-to-face and the bottom surface 12b intersect mutually at right angle. The driven member 24 and the rolling members 25, 26, 27, and 28 are accommodated inside the base member 12, and each of the rolling members 25, 26, 27, and 28 makes a contact with the driven member 24, at a first contact point, and makes a contact with the base member 12 at two second contact points. Here, the rolling member 25 and the rolling member 27 are disposed along a longitudinal direction of the driven member 24. Moreover, the rolling member 26 and the rolling member 28 are disposed along the longitudinal direction of the driven member 24, to correspond to the rolling member 25 and the rolling member 27. Consequently, regarding a positional relationship of the base member 12 and the driven member 24, since the rolling members 25 and 26, and the rolling members 27 and 28 are similar, in the following description, the rolling members 25 and 26 are described, and description of the rolling members 27 and 28 is omitted.

The positional relationship of the base member 12 and the driven member 24 will be described concretely. In the ultrasonic motor 10, the rolling member 25 makes a contact with the driven member 24 at a contact point 25a (a first contact point), and makes a contact with the side surface 12a of the base member 12 at a contact point 25b (a second contact point), and furthermore, makes a contact with the bottom surface 12b of the base member 12 at a contact point 25c (a second contact point). A shape of the base member 12 is set corresponding to a curvature of the curved surface portion 24b of the driven member 24 and an outer diameter of the rolling member 25 such that, a length of a straight line L1 connecting the contact point 25a and the contact point 25b, and a length of a straight line L2 connecting the contact point 25a and the contact point 25c are same. Moreover, the contact point 25b and the contact point 25c are at positions which are symmetrical with respect to the contact point 25a, or with respect to a straight line L3 connecting a curvature center 24c of the curved surface portion 24b of the driven member 24 and the contact point 25a, extended toward the base member 12.

Similarly, the rolling member 26 makes a contact with the driven member 24 at a contact point 26a (a first contact point), and makes a contact with the side surface 12c of the base member 12 at a contact point 26b (a second contact point), and furthermore, makes a contact with the bottom surface 12b of the base member 12 at a contact point 26c (a second contact point). The shape of the base member 12 is set corresponding to a curvature of the curved surface portion 24b of the driven member 24, and an outer diameter of the rolling member 26 such that, a length of a straight line L4 connecting the contact point 26a and the contact point 26b, and a length of a straight line L5 connecting the contact point 26a and the contact point 26c are same. Moreover, the contact point 26b and the contact point 26c are at positions which are symmetrical with respect to the contact point 26a, or with respect to a straight line L6 connecting the curvature center 24c of the curved surface portion 24b of the driven member 24 and the contact point 26a, extended toward the base member 12.

In the ultrasonic motor 10 having the structure as described above, when the driven member 24 is driven in the longitudinal direction (x-direction) in a state of being pushed toward the base member 12, the rolling member 25 undergoes a rolling movement upon receiving a driving force in the longitudinal direction of the driven member 24 at the contact point 25a with the driven member 24. At this time, by the contact points 25b and 25c of the base member 12 being at positions symmetrical with respect to the extended straight line L3, a length of a rolling contact at the contact point 25b and a length of a rolling contact at the contact point 25c are same. Consequently, no slippage is generated between the rolling member 25 and the base member 12. Furthermore, although the driven member 24 is pushed by the base member 12, by making such structure, there is an advantage that a drag at the contact point 25b and the contact point 25c becomes same, and a rolling resistance at the contact points 25b and 25c becomes even. Such action and effect are similar also for the rolling member 26.

Whereas, when the contact points 25b and 25c are assumed to be at positions asymmetrical with respect to the contact point 25a, when the driving force is received at the contact point 25a, a difference is generated between a rotating length on a surface of the rolling member 25 drawn by the contact point 25b along a direction in which the rolling member 25 rotates, and a rotating length on the surface of the rolling member 25 drawn by the contact point 25c. Therefore, a portion making a sliding contact without making a rolling contact is generated at one of the contact point 25b and the contact point 25c.

Moreover, in the ultrasonic motor 110 according to the modified embodiment shown in FIG. 3, a base member 112, at an inner side, has a shape such that an angle made by a bottom surface 112b and side surfaces 112a and 112c becomes an obtuse angle. Even in this ultrasonic motor 110, similarly as in the ultrasonic motor 10 shown in FIG. 2, the rolling member 25 makes a contact with the driven member 24 at the contact point 25a (a first contact point), and makes a contact with the side surface 112a of the base member 112 at the contact point 25b (a second contact point), and furthermore, makes a contact with the bottom surface 112b of the base member 112 at the contact point 25c (a second contact point). A shape of the base member 112 is set corresponding to a curvature of the curved surface portion 24b of the driven member 24 and the outer diameter of the rolling member 25 such that, a length of a straight line L11 connecting the contact point 25a and the contact point 25b, and a length of a straight line L12 connecting the contact point 25a and the contact point 25c are same. Moreover, the contact point 25b and the contact point 25c are at positions which are symmetrical with respect to the contact point 25a, or with respect to a straight line L13 connecting the curvature center 24c of the curved surface portion 24b of the driven member 24 and the contact point 25a, extended toward the base member 112. Moreover, such positional relationship is similar even for the rolling member 26. By such an arrangement, even in this ultrasonic motor 110, it is possible to show similar action and effect as in the ultrasonic motor 10 shown in FIG. 2.

By making a structure as described above, since the driven member 24 is rollingly supported without being slipped, by the rolling members 25, 26, 27, and 28, it is possible to make small a transfer resistance of the driven member 24 and to reduce an output, and to reduce wearing out. Moreover, since the rolling members 25, 26, 27, and 28 support not at a position exactly under z-direction (side facing the vibrator 22) of the driven member 24 but at a position strayed off on both sides, or in other words, on sides of the side surface of the base member 12, it is possible to make small a dimension in a direction of height (z-direction). Therefore, it is possible to make the ultrasonic motor 10 to be small-sized, involving a structure which is rollingly supported by the driven member 24 as in this embodiment.

Figure 4:
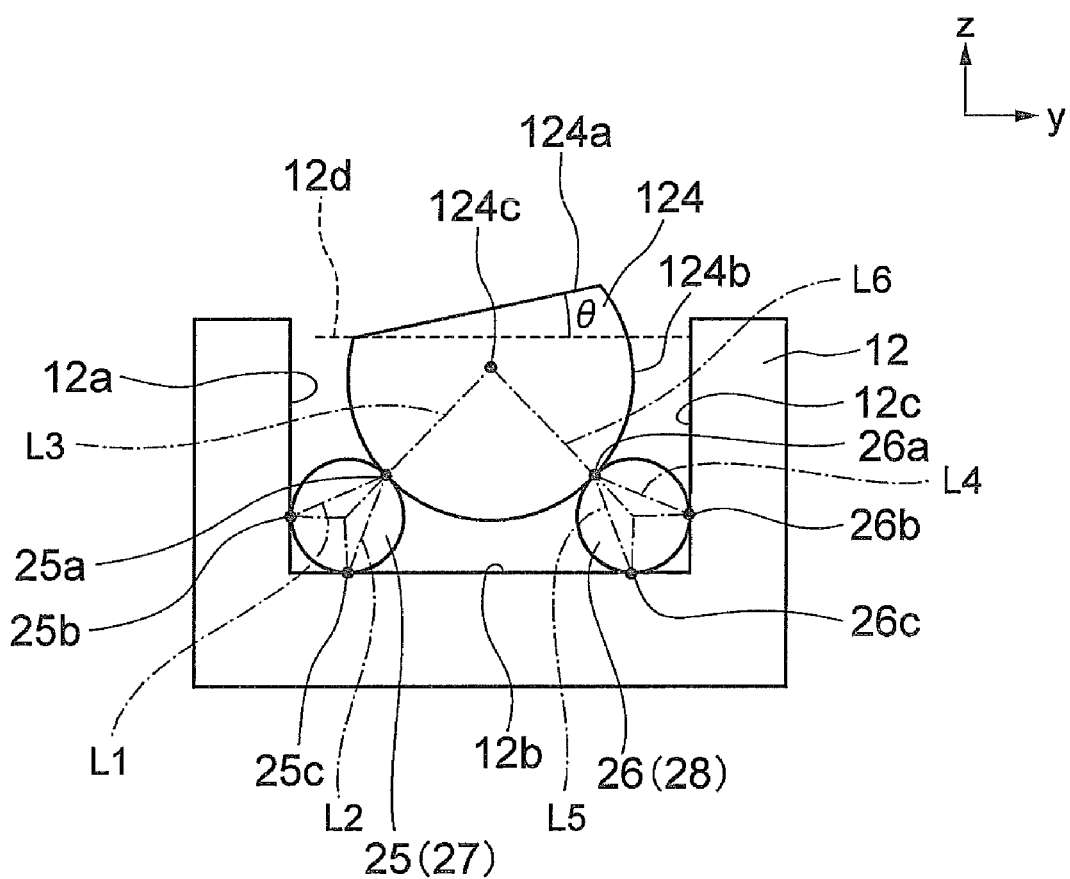
FIG. 4 is a cross-sectional view orthogonal to a center in a longitudinal direction of a base member of an ultrasonic motor according to a second modified embodiment of the first embodiment.

FIG. 4 is a cross-sectional view orthogonal to a center in a longitudinal direction (direction (x-direction) orthogonal to y-direction and z-direction) of the base member 12 of an ultrasonic motor according to a second modified embodiment of the first embodiment, and is a diagram showing a positional relationship of a driven member 124, the base member 12, and the rolling members 25, 26, 27, and 28. As shown in FIG. 4, a flat surface portion 124a of the driven member 124, which is a contact surface with the vibrator 22, makes an angle θ with a straight line 12d which is extended in a horizontal direction (y-direction). Even in this case, the driven member 124 is a member in the form of a shaft having a substantially D-shaped cross-section, with a part of a circular cylinder cut, and similarly as the driven member 24 shown in FIG. 1, the flat surface portion 124a is in contact with the vibrator 22 via the stator 22a, and a curved surface portion 124b makes a contact with each of the rolling members 25, 26, 27, and 28. When the rolling member 25 is taken as an example, the rolling member 25 makes a contact with the driven member 124 at a contact point 25a (a first contact point), and makes a contact with the side surface 12a of the base member 12 at a contact point 25b (a second contact point), and furthermore, makes a contact with the bottom surface 12b of the base member 12 at a contact point 25c (a second contact point). The shape of the base member 12 is set corresponding to a curvature of the curved surface portion 124b of the driven member 124, and an outer diameter of the rolling member 25 such that, a length of a straight line L1 connecting the contact point 25a and the contact point 25b, and a length of a straight line L2 connecting the contact point 25a and the contact point 25c are same. Moreover, the contact point 25b and the contact point 25c are at positions which are symmetrical with respect to the contact point 25a, or with respect to a straight line L3 connecting a curvature center 124c of the curved surface portion 124b of the driven member 124 and the contact point 25a, extended toward the base member 12.

According to such positional relationship, similarly as in the ultrasonic motor 10 described in FIG. 1A, FIG. 1B, and FIG. 2, and the ultrasonic motor 110 described in FIG. 3, no slippage is generated between the rolling member 25 and the base member 12, and a drag at the contact point 25b and the contact point 25c becomes same, and the rolling resistance at the contact points 25b and 25c becomes even. Consequently, a position of the contact point 25a is constant, independent of the contact surface 124a of the vibrator 22 and the driven member 24, and the abovementioned relationship L1=L2 can be maintained. Therefore, even when the driven member is inclined with respect to the horizontal direction, since the driving member 25 can undergo rolling movement, it is possible to reduce an effect of variation in assembling.

Figure 5:
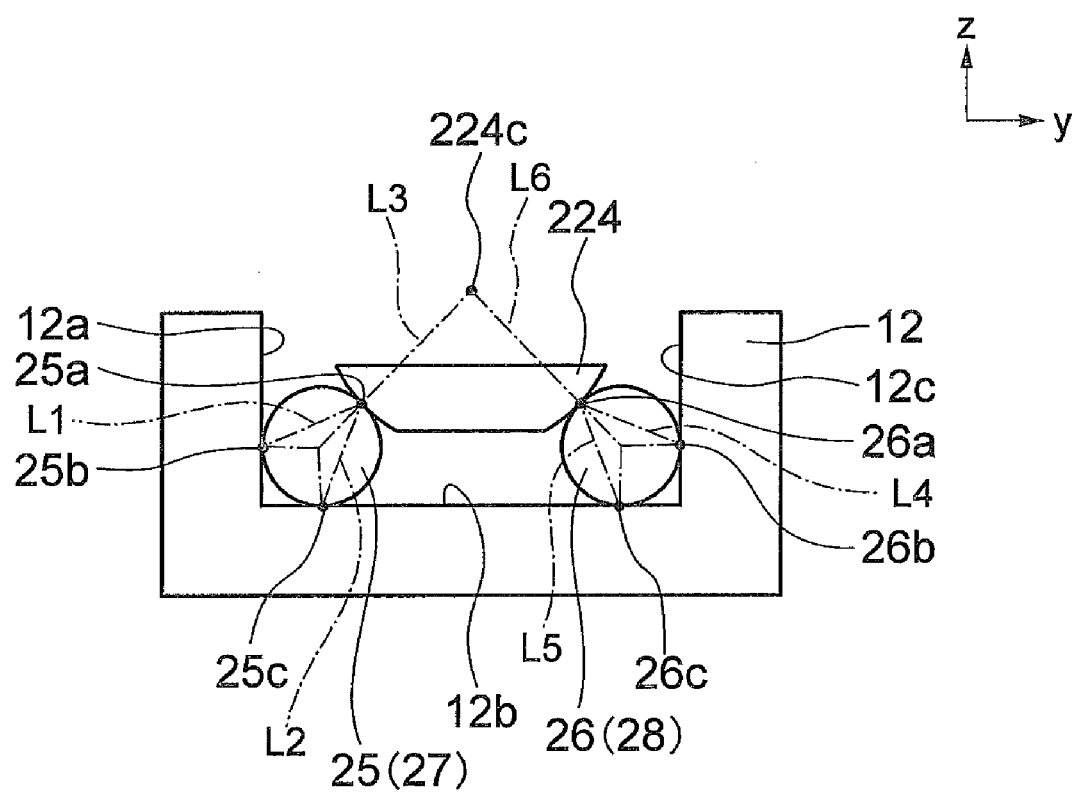
FIG. 5 is a cross-sectional view orthogonal to a center in a longitudinal direction of a base member of an ultrasonic motor according to a third modified embodiment of the first embodiment.

FIG. 5 is a cross-sectional view orthogonal to a center in a longitudinal direction (x-direction) of the base member 12 of an ultrasonic motor according to a third modified embodiment of the first embodiment, and is a diagram showing a positional relationship of a driven member 224, the base member 12, and the rolling members 25, 26, 27, and 28. As shown in FIG. 5, the driven member 224 is a member in the form of a shaft substantially trapezoidal-shaped cross-section, with an upper portion and a lower portion having a circular-cylindrical shape cut, and similarly as the driven member 24 shown in FIG. 1, a flat surface portion 224a is in contact with the vibrator 22 via the stator 22a, and a curved surface portion 224b makes a contact with each of the rolling members 25, 26, 27, and 28. A positional relationship of the base member 12, the driven member 224, and the rolling members 25, 26, 27, and 28 is similar as the ultrasonic motors shown in the diagrams from FIG. 1A to FIG. 4. When such an arrangement is made, since it is possible to reduce a size in a direction of height of the driven member 224, it is possible to make further smaller a dimension in a direction of height of the ultrasonic motor as a whole, thereby leading to small-sizing.

Second Embodiment

Figure 6:
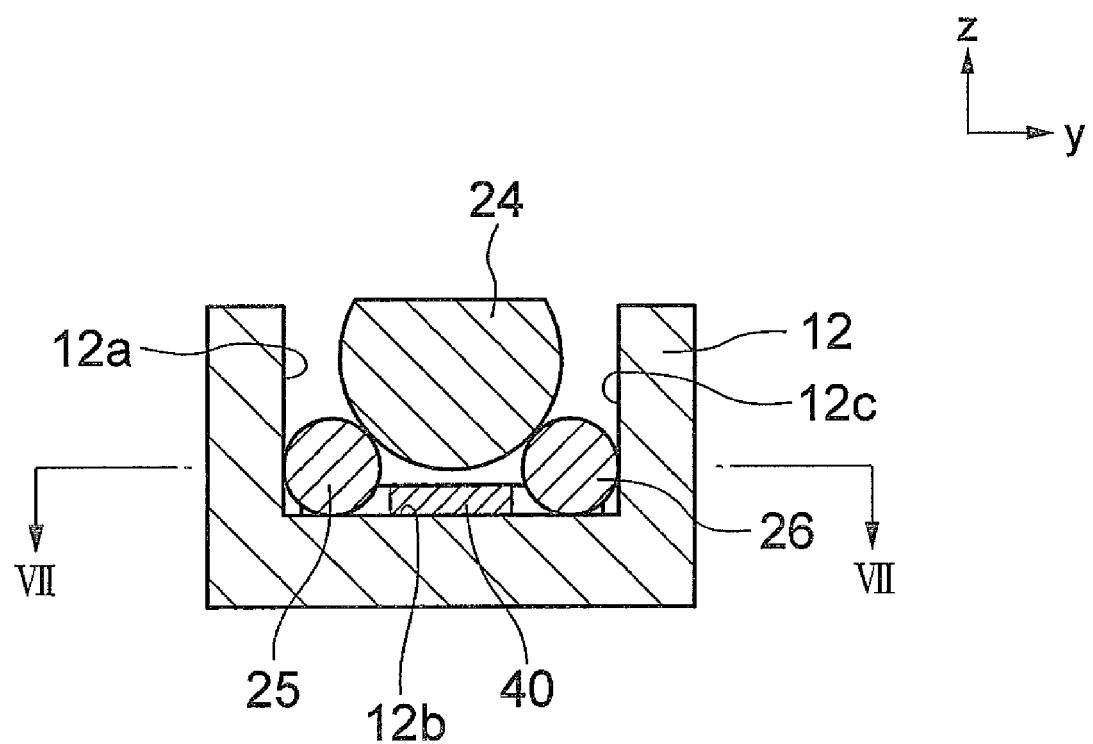
FIG. 6 is cross-sectional view which is orthogonal to a longitudinal direction of a base member of an ultrasonic motor according to a second embodiment of the present invention, and which passes through a rolling member.
Figure 7:
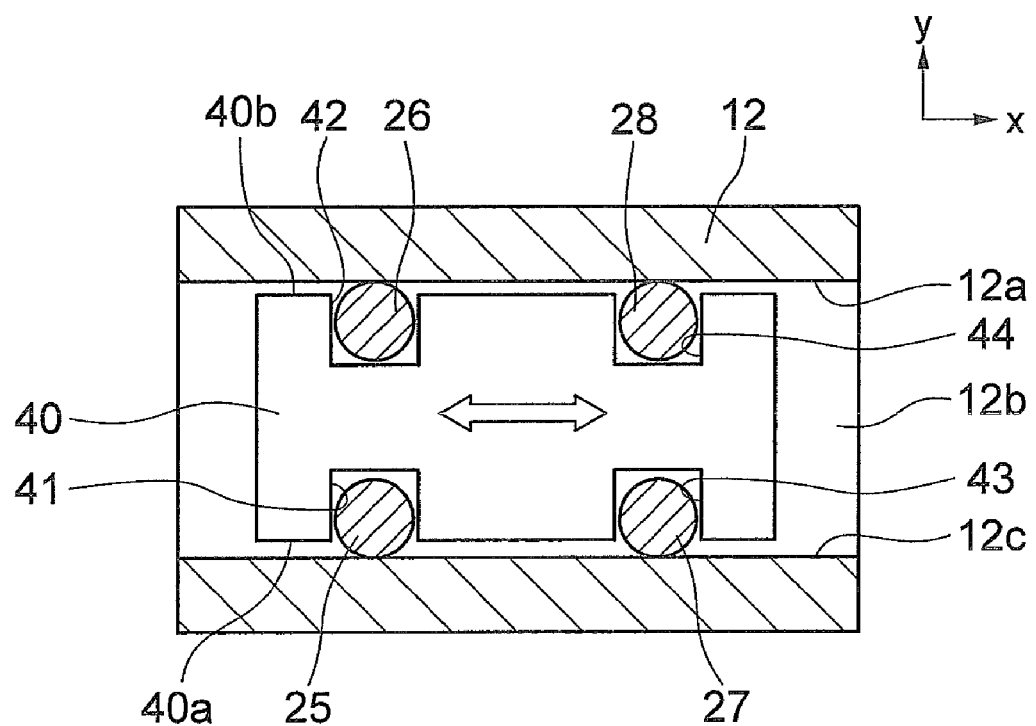
FIG. 7 is a cross-sectional view taken along a line VII-VII in FIG. 6.

An ultrasonic motor (a linear drive ultrasonic motor) according to a second embodiment will be described below while referring to FIG. 6 and FIG. 7. Here, FIG. 6 is a cross-sectional view which is orthogonal to a longitudinal direction (direction (x-direction) orthogonal to y-direction and z-direction) of the base member 12 of the ultrasonic motor, and which passes through the rolling members 27 and 28, and is a diagram showing a positional relationship of the driven member 24, the base member 12, and the rolling members 25, 26, 27, and 28. FIG. 7 is a cross-sectional view taken along a line VII-VII in FIG. 6. In the following description, same reference numerals are assigned to members, which are similar as in the ultrasonic motor according to the first embodiment.

In the ultrasonic motor according to the second embodiment, the following arrangement differs from the ultrasonic motor 10 according to the first embodiment. In other words, a guiding member 40 is disposed on the bottom surface 12b of the base member 12. This guiding member 40 is made by forming notches 41, 42, 43, and 44, two each in two long sides which are face-to-face, of a thin long plate. The rolling members 25, 26, 27, and 28 are accommodated in the notches 41, 42, 43, and 44 respectively, and are guided. The notches 41 and 43 are disposed to be separated by a predetermined distance, in one long side 40a of the guiding member 40, and the notches 42 and 44 are disposed to be separated by a predetermined distance, corresponding to the notches 41 and 43, in the other long side 40b of the guiding member 40. According to such an arrangement, the four rolling members 25, 26, 27, and 28 are disposed to maintain uniformity. Consequently, since a load on the rolling members 25, 26, 27, and 28 is even, there is an effect that characteristics are stabilized. When the guiding member 40 is let to be a resin member, it is desirable since sliding of the bottom surface 12b of the base member 12 becomes favorable.

Rest of the structure, action, and effect are similar as in the first embodiment.

Third Embodiment

Figure 8:
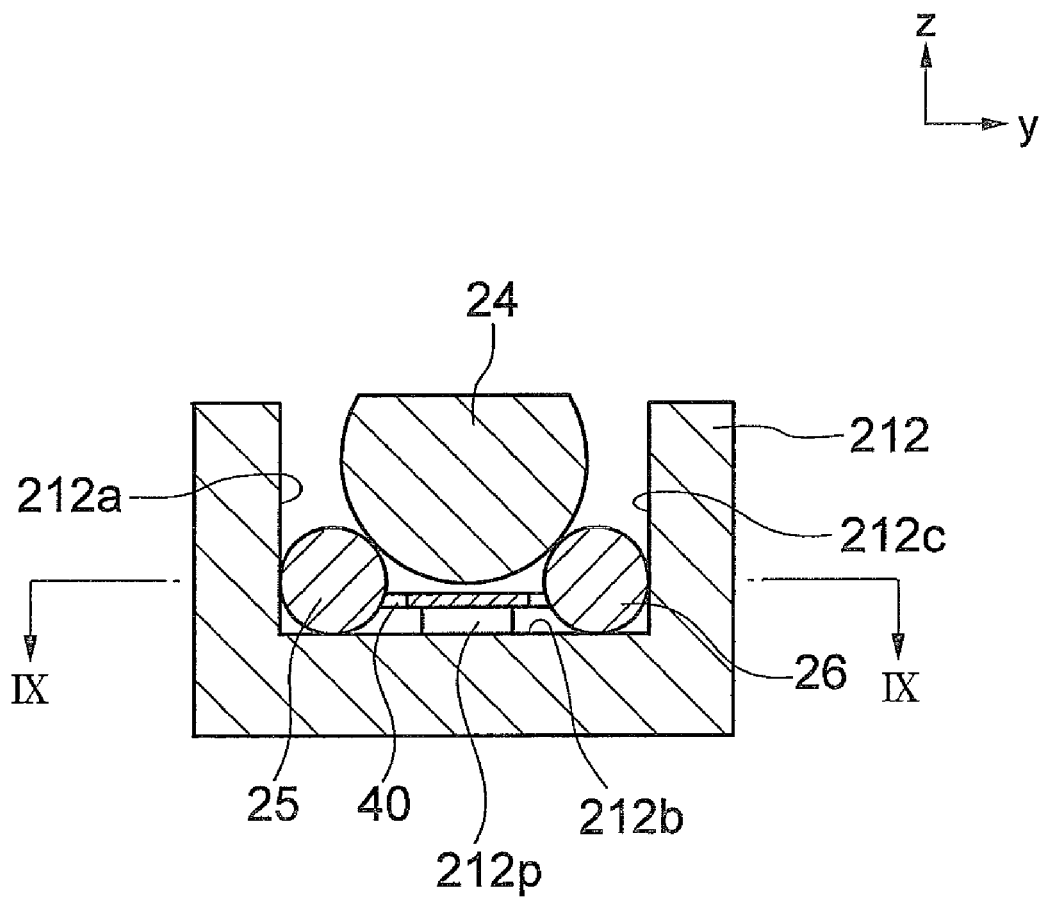
FIG. 8 is a cross-sectional view which is orthogonal to a longitudinal direction of a base member of an ultrasonic motor according to a third embodiment of the present invention, and which passes through a rolling member.
Figure 9:
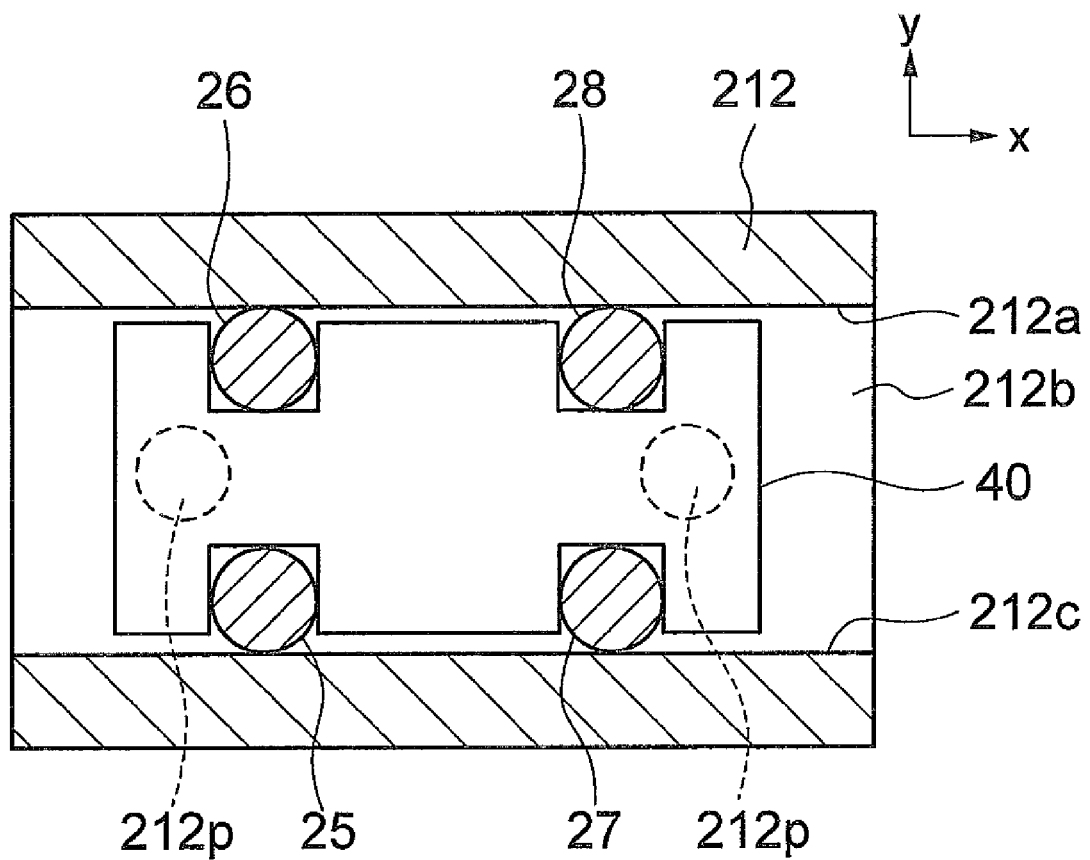
FIG. 9 is a cross-sectional view taken along a line IX-IX in FIG. 8.
Figure 10:
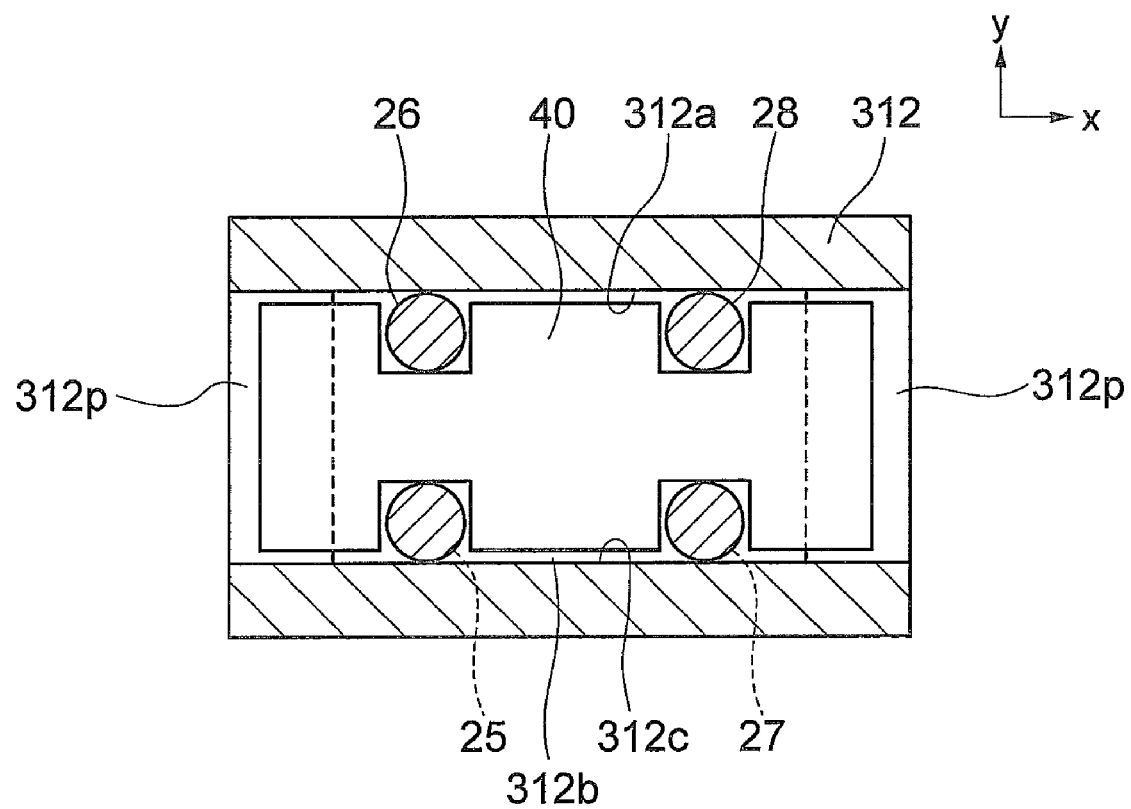
FIG. 10 is cross-sectional view showing a positional relationship of the base member, a guiding member, a protruding portion, and the rolling member according to the third embodiment.

An ultrasonic motor (a linear drive ultrasonic motor) according to a third embodiment and a modified embodiment thereof will be described below while referring to FIG. 8, FIG. 9, and FIG. 10. Here, FIG. 8 is a cross-sectional view which is orthogonal to a longitudinal direction (a direction (x-direction) orthogonal to y-direction and z-direction) of the base member of the ultrasonic motor, and which passes through the rolling members 25, 26, 27, and 28, and is a diagram showing a positional relationship of the driven member 24, the base member 12, and the rolling members 25, 26, 27, and 28. FIG. 9 is a cross-sectional view taken along a line IX-IX in FIG. 8. FIG. 10 is a cross-sectional view showing a positional relationship of the base member 12, the guiding member 40, a protruding portion 312p, and the rolling members 25, 26, 27, and 28, and is a diagram corresponding to FIG. 9. In the following description, same reference numerals are assigned to members, which are similar as in the ultrasonic motor according to the first embodiment and the ultrasonic motor according to the second embodiment.

In the ultrasonic motor according to the third embodiment, the following arrangement differs from the ultrasonic motor 10 according to the first embodiment. In other words, as shown in FIG. 8 and FIG. 9, a protruding portion 212p in the form of a circular cylinder at two locations is provided to a bottom surface 212b of a base member 212, and the guiding member 40 is disposed thereon. According to this arrangement, even when the guiding member 40 is made thin, since it is disposed at a position higher than the bottom surface 212b of the base member 212, the rolling members 25, 26, 27, and 28 do not run on the guiding member 40. Moreover, since it is possible to make the guiding member 40 thin, trimming of weight becomes possible, and a transfer resistance of the guiding member 40 can be reduced.

Moreover, the shape of the protruding portion 212p is not restricted to the circular-cylindrical shape, and as shown in FIG. 10, a protruding portion 312b by making protrude an area near two ends in a longitudinal direction (x-direction) of the base member 312, in a direction of height, may be formed. A similar effect is achieved by such an arrangement, and it is possible to carry out a stopper function in which the rolling members 25, 26, 27, and 28 do not come off in a longitudinal direction of the base member 12.

Rest of the structure, action, and effect are similar as in the first embodiment.

Fourth Embodiment

Figure 11A:
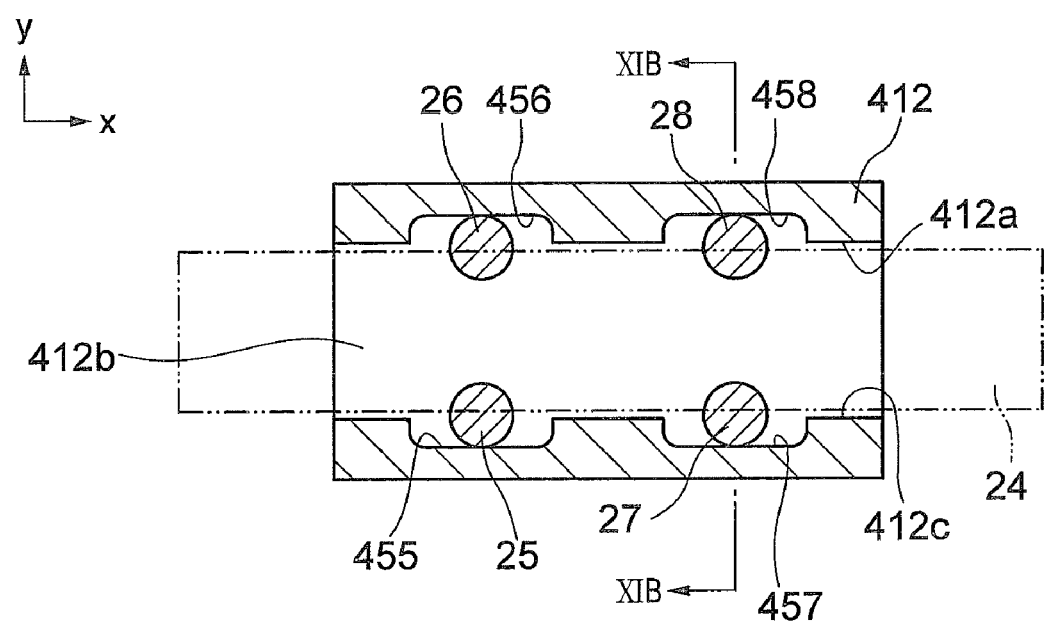
FIG. 11A is a cross-sectional view showing a positional relationship of a driven member, a base member, and a rolling member according to a fourth embodiment.
Figure 11B:
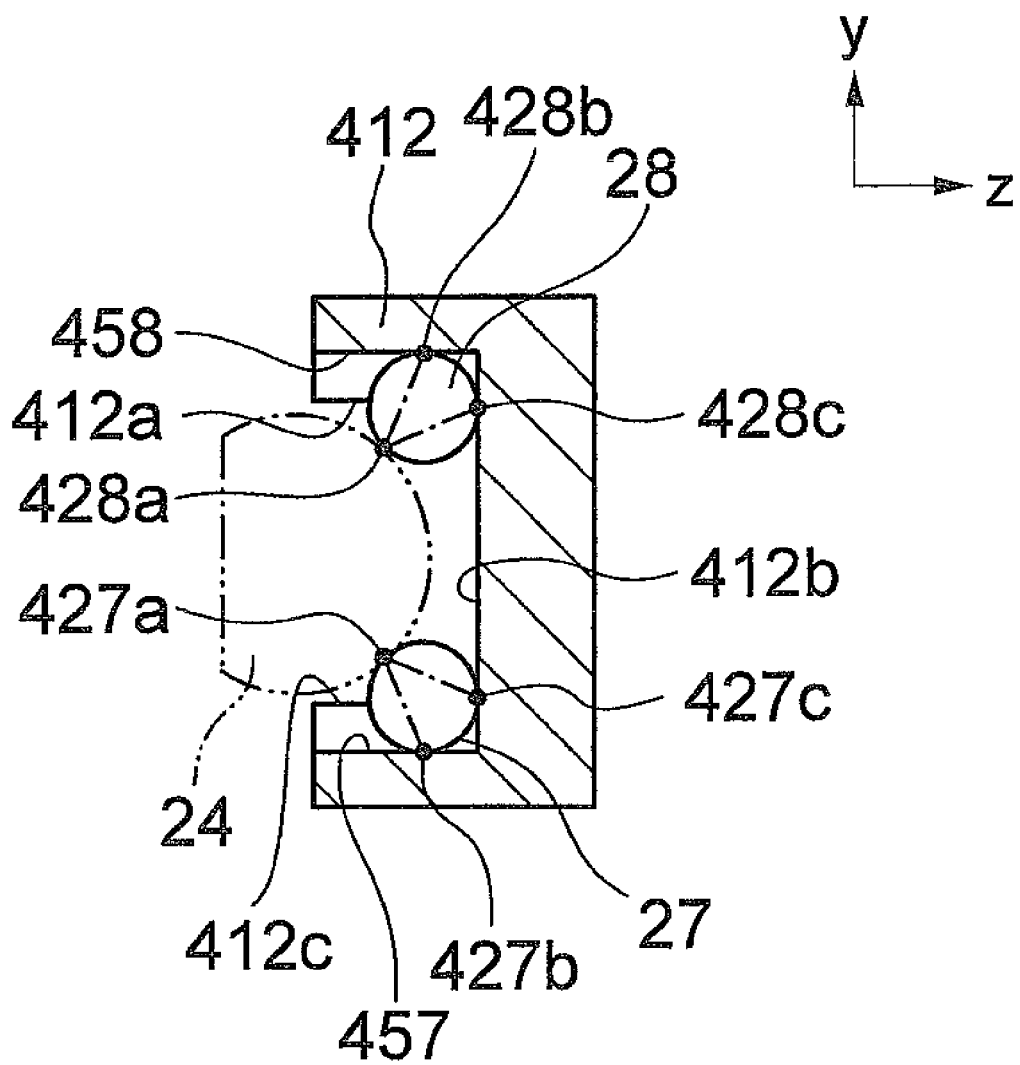
FIG. 11B is a cross-sectional view showing a positional relationship of the driven member, the base member, and the rolling member according to the fourth embodiment, and is a cross-sectional view taken along a line XIB-XIB in FIG. 11A.
Figure 12A:
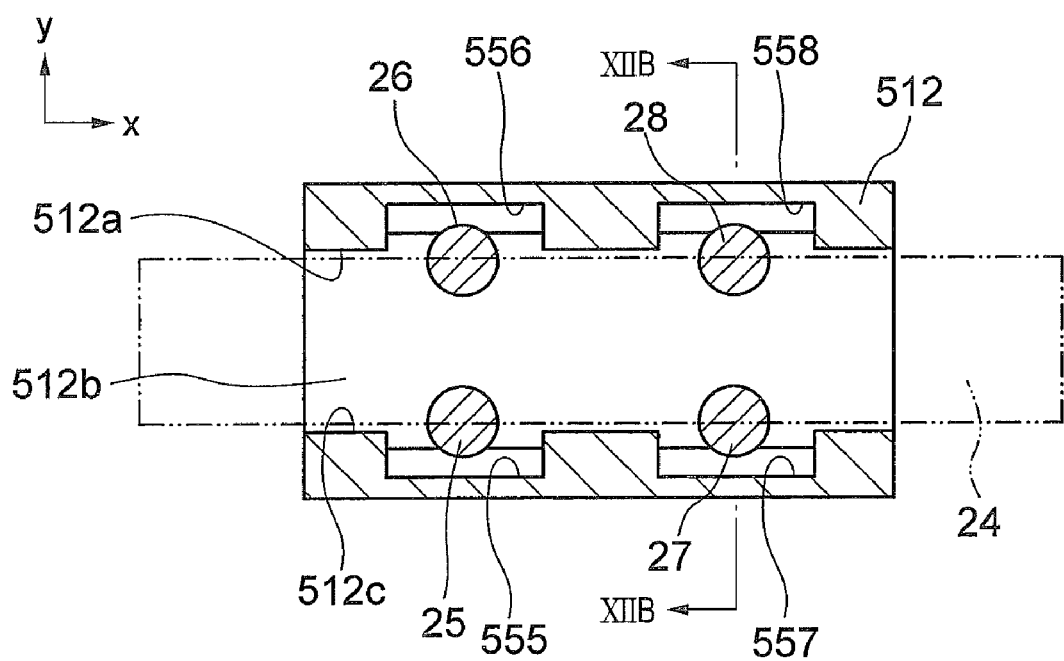
FIG. 12A is a cross-sectional view showing a positional relationship of a driven member, a base member, and a rolling member according to a modified embodiment of the fourth embodiment.
Figure 12B:
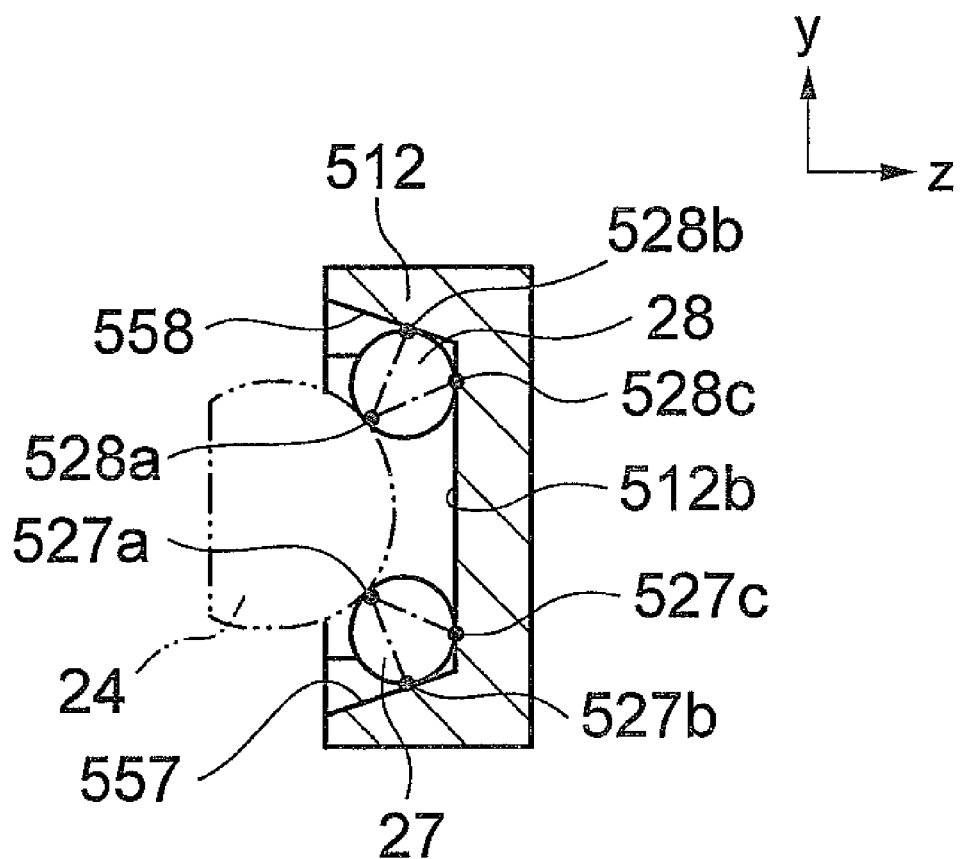
FIG. 12B is a cross-sectional view showing a positional relationship of the driven member, the base member, and the rolling member according to the modified embodiment of the fourth embodiment, and is a cross-sectional view taken along a line XIIB-XIIB in FIG. 11A.

Next, a fourth embodiment and a modified embodiment thereof will be described below while referring to FIG. 11A, FIG. 11B, FIG. 12A, and FIG. 12B. Here, FIG. 11A is a cross-sectional view showing a positional relationship of the driven member 24, a base member 412, and the rolling members 25, 26, 27, and 28 according to the fourth embodiment, and is a diagram corresponding to FIG. 7. FIG. 11B is a cross-sectional view taken along a line XIB-XIB in FIG. 11A. FIG. 12A is a cross-sectional view showing a positional relationship of the driven member 24, a base member 512, and the rolling members 25, 26, 27, and 28 according to the modified embodiment, and is a diagram corresponding to FIG. 7. FIG. 12B is a cross-sectional view taken along a line XIIB-XIIB in FIG. 12A. In the following description, same reference numerals are assigned to members, which are similar as in the ultrasonic motor according to the first embodiment.

In an ultrasonic motor according to the fourth embodiment, the following arrangement differs from the ultrasonic motor 10 according to the first embodiment. In other words, as shown in FIG. 11A and FIG. 11B, notches 455, 456, 457, and 458 (base guiding mechanisms) are provided to two inner-side surfaces 412a and 412c of a base member 512, which are face-to-face. These notches 455, 456, 457, and 458 are formed such that, a side surface is perpendicular to a bottom surface 412b of the base member 412, and the rolling members 25, 26, 27, and 28 are disposed at an interior thereof respectively. Here, a length of a straight line connecting a contact point 428a of the driven member 24 and the rolling member 28 and a contact point 428b of the rolling member 28 and the side surface of the notch 458 is same as a length of a straight line connecting the contact point 428a and a contact point 428c of the rolling member 28 and the bottom surface 412b of the base member 412. In such an arrangement, when the driven member 24 is driven, the rolling members 25, 26, 27, and 28 roll in a range of the notches 455, 456, 457, and 458. Consequently, since the disposing of the driven member 24, the base member 412, the rolling members 25, 26, 27, and 28, and the notches 455, 456, 457, and 458 is determined substantially, it is possible to stabilize characteristics by making even the load on the rolling members 25, 26, 27, and 28, and the guiding member of the second embodiment and the third embodiment becomes unnecessary, thereby making it possible to reduce the number of components.

Whereas, notches 555, 556, 557, and 558 (base guiding mechanisms) having a shape such that, an angle made by a bottom surface 512b of a base member 512 and a side surface of the base member 512 is an obtuse angle may be disposed inside the rolling members 25, 26, 27, and 28 respectively (FIG. 12A and FIG. 12B). In this case, an angle at which, a side surface of the notches 555, 556, 557, and 558 intersect with the bottom surface 512b of the base member 512 is set as follows. In other words, the angle is set to be such that, a length of a straight line connecting a contact point 528a of the driven member 24 and the rolling member 28 and a contact point 528b of the rolling member 28 and the side surface of the notch 558 is same as a length of a straight line connecting the contact point 528a and a contact point 528c of the rolling member 28 and the bottom surface 512b of the base member 512.

The rest of the structure, action, and effect are similar as in the first embodiment.

Figure 18A:
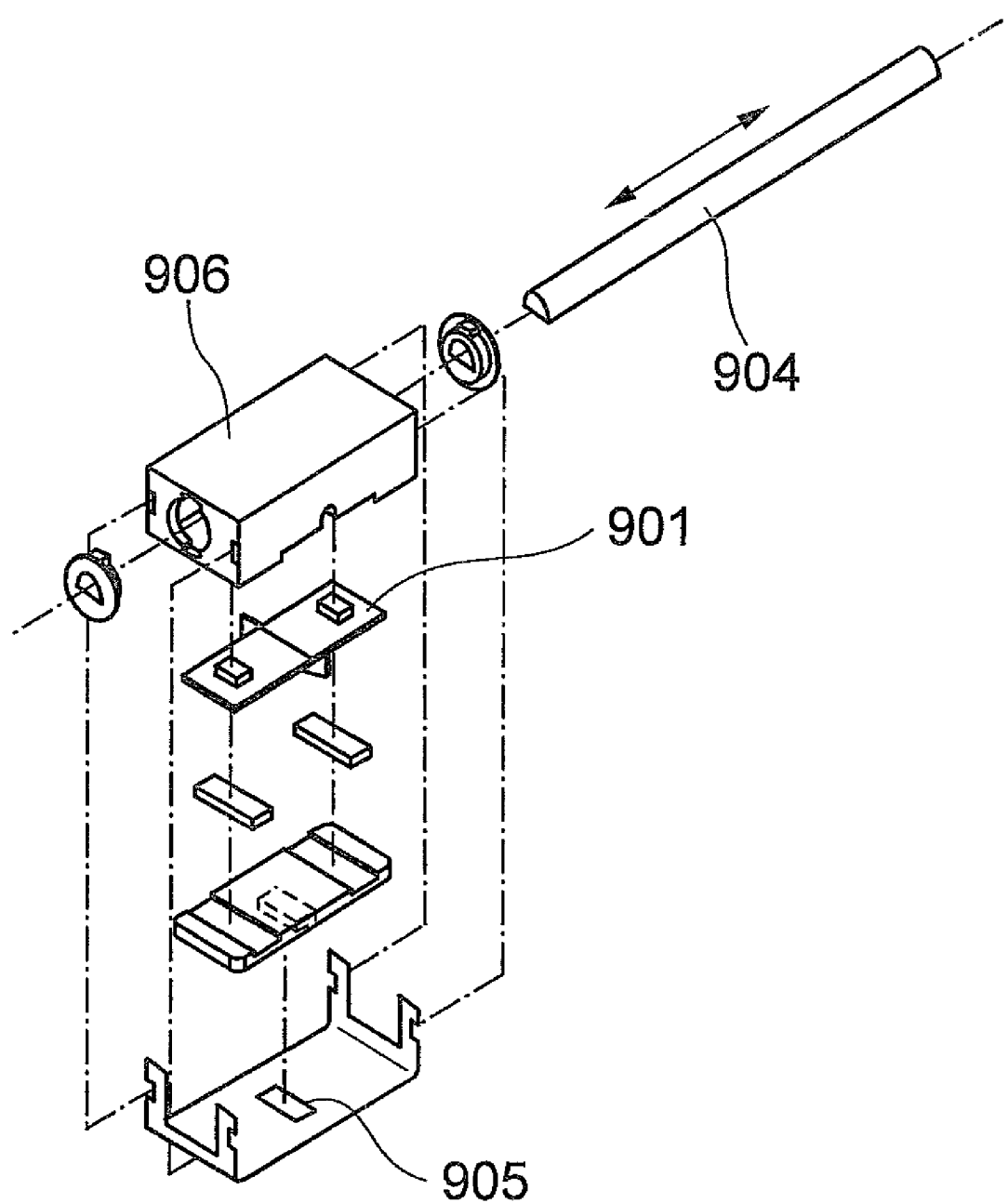
FIG. 18A is a diagram showing a structure of a conventional linear drive ultrasonic motor, and is an exploded perspective view.
Figure 18B:
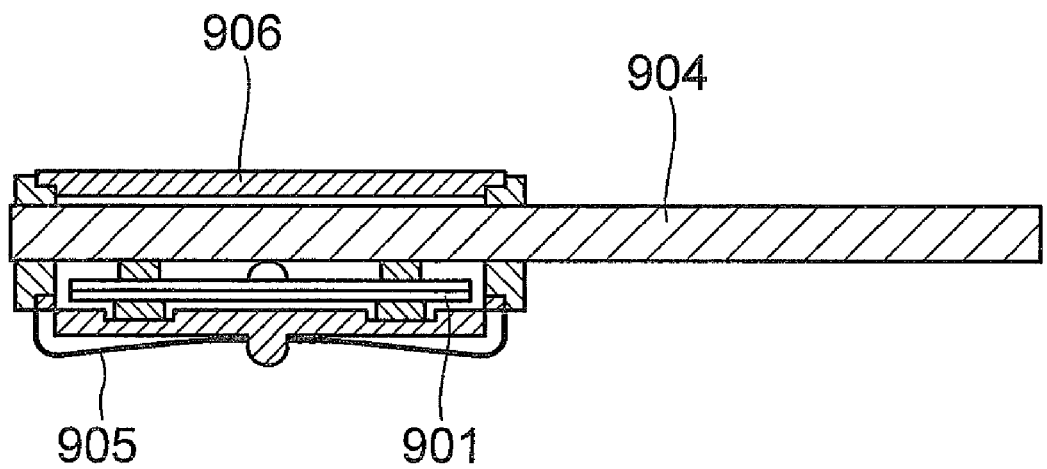
FIG. 18B is a diagram showing the structure of the conventional linear drive ultrasonic motor, and is a vertical cross-sectional view.

In a conventional linear drive ultrasonic motor shown in FIG. 18A and FIG. 18B, since a mobile object 904 receives a thrust from a vibrator 901 by a pressing spring 905, a contact portion of the mobile object 904 and a case 906 is in a state of a pressure due to the thrust acted thereon. Consequently, a frictional resistance in this contact portion becomes substantial. Furthermore, when the mobile object 904 is to be driven, a state of vibrating all the time by the vibrator 91, or in other words, a state of being subjected to forced vibrations is assumed. Therefore, by the forced vibrations being imparted in addition to the pressure, wearing out and noise at a sliding portion of the mobile object 904 and the case 906 become a problem.

Whereas, in the ultrasonic motor according to each of the abovementioned embodiments and modified embodiments, since the structure is such that the base member, the driven member, and the rolling members are disposed such that, there is no slippage at the time of moving the driven member, the wearing out and noise can be reduced. Therefore, it is particularly effective as a guide structure of an actuator which drives by a vibrating body such as an ultrasonic vibrator.

Figure 13:
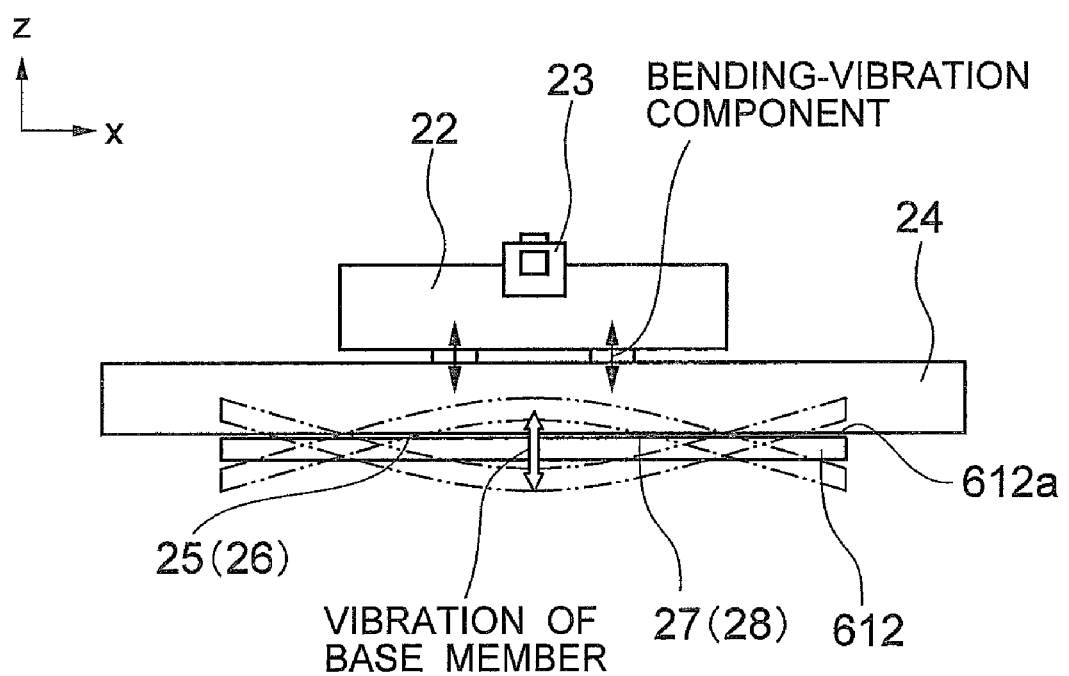
FIG. 13 is a side view showing a structure of an ultrasonic motor according to an example for comparison.
Figure 14:
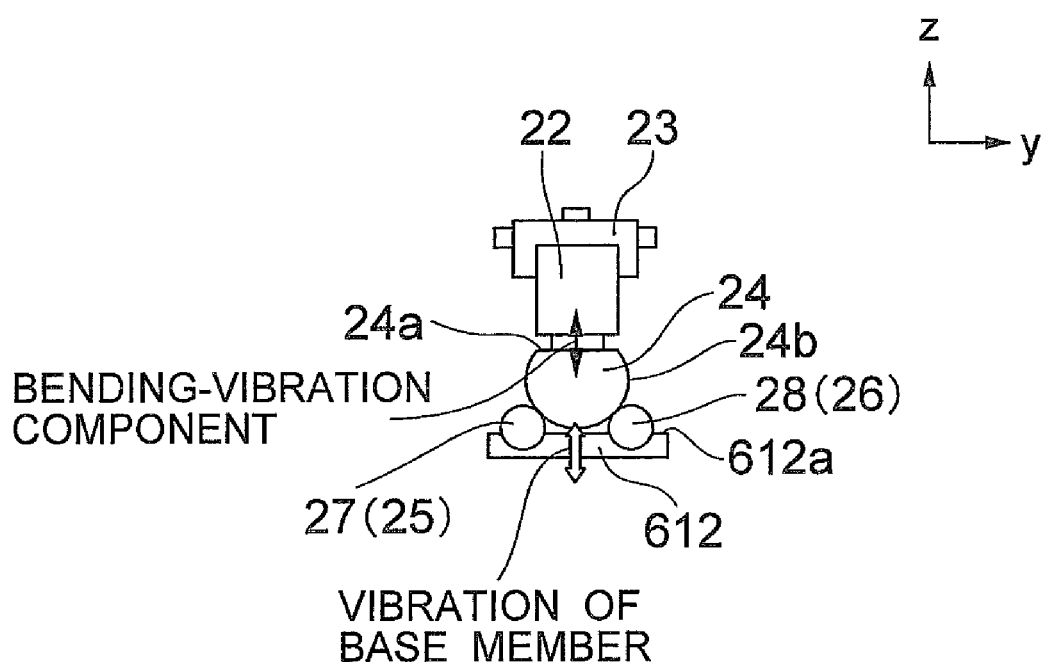
FIG. 14 is a front view showing a structure of the ultrasonic motor according to the example for comparison.
Figure 15:
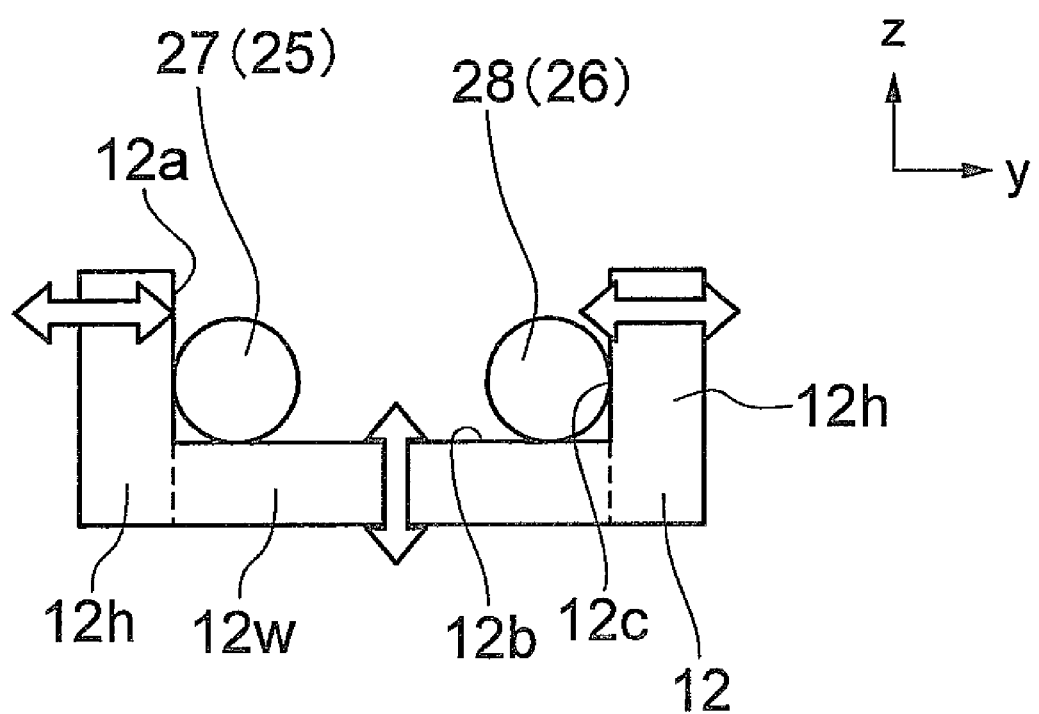
FIG. 15 is a front view showing a positional relationship of a base member and rolling members according to the first embodiment and the modified embodiments thereof.

An effect by the ultrasonic motor according to the first embodiment and the modified embodiments thereof will be described below by referring to diagrams from FIG. 13 to FIG. 15. FIG. 13 is a side view showing a structure of an ultrasonic motor according to an example for comparison. FIG. 14 is a front view showing a structure of the ultrasonic motor according to the example for comparison. FIG. 15 is a front view showing a positional relationship of the base member and the rolling members according to the first embodiment and the modified embodiments thereof. In FIG. 13 and FIG. 14, the case member is not shown.

In the ultrasonic motor according to the example for comparison, a point that a base member 612 is a member in the form of a flat plate, differs from the first embodiment. This base member 612 makes a contact with the rolling members 25, 26, 27, and 28 at an upper surface 612a, and the rolling members 25, 26, 27, and 28 make a contact with the curved surface portion 24b of the driven member 24.

In the ultrasonic motor according to the example for comparison having such structure, in a case of driving the driven member 24 by making vibrate by using the vibrator 22, the vibration is transmitted from the driven member 24 also to be base member 612 via the rolling members 25, 26, 27, and 28. In this case, since the base member 612 in the form of a flat plate is used, stiffness of the base member 612 becomes weak, and a vibration mode in which, the base member 612 is deformed by being bent in a direction of bending vibration of the vibrator 22 is susceptible to be excited. Moreover, as shown by dotted lines in FIG. 13, without being restricted to a first-order mode of bending, even a mode of higher order is also generated. Due to generation of such vibration, the rolling members 25, 26, 27, and 28, and the driven member 24 are not stabilized, and driving characteristics are declined. Moreover, there is an increase in noise caused due to wearing out or collision at a contact portion of the rolling members 25, 26, 27, and 28, and the driven member 24, or the base member 612. Whereas, in a case of increasing stiffness of the base member 612 presumptively, it is necessary to increase a plate thickness of the base member 612, which leads to making the size of the ultrasonic motor large.

On the other hand, in the ultrasonic motor according to the embodiments and the modified embodiments described above, the cross-sectional shape is let to be substantially recess-shaped (FIG. 15) such that, the contact is made with the rolling members 25, 26, 27, and 28 by the bottom surface 12b and the side surfaces 12a and 12c of the base member 12. When the base member 12 is let to have such cross-sectional shape, the stiffness of the base member 12 is improved, and a negative effect due to vibration such as mentioned above can be avoided. Concretely, the stiffness is improved by a side surface portion 12h having a reinforcing function with respect to a deformation due to bending in a vertical direction (z-direction) of a bottom surface portion 12w, and with respect to the deformation in a left-right direction (y-direction) of the side surface portion 12h, the stiffness is improved by the bottom surface portion 12w having the reinforcing function. Consequently, vibration of the bending deformation mode as shown in FIG. 13 is hard to be excited. Therefore, the structure of the base member according to the embodiments and the modified embodiments described above is particularly effective from a point that, it is possible to realize small-sizing and improvement in driving characteristics in a guiding structure of the actuator which is driven upon being vibrated all the time by the vibrator 22.

Furthermore, letting the cross-sectional shape of the base member 12 to be substantially recess-shaped, at the time of incorporating the rolling members 25, 26, 27, and 28, since the rolling members 25, 26, 27, and 28 are regulated in two directions namely, the side surfaces 12a and 12c, and the bottom surface 12b of the base member 12, the purpose is served only by placing the rolling members 25, 26, 27, and 28 on the base member 12. Furthermore, since an attitude of the rolling members 25, 26, 27, and 28 and the driven member 24 is determined only by placing the driven member 24 from an upper side the rolling members 25, 26, 27, and 28, jig etc. of positioning is unnecessary. Therefore, there is an advantage that assemblability can be improved.

Moreover, in the second embodiment, the third embodiment, and the modified embodiments thereof, the four spherical-shaped rolling members 25, 26, 27, and 28 are disposed on the base member having a shape of an English alphabet U turned counterclockwise through 90 degrees, upon being guided by guiding members or notches, and support the curved surface portion 24b of the driven member 24. Each rolling member makes a contact with the curved surface portion 24b of the driven member 24 and the side surface and the bottom surface of the base member. Furthermore, the shape of the base member is set to be such that the length of two straight lines connecting the contact point of the rolling member and the driven member, and the two contact points connecting the base member and the rolling member are substantially same. According to this, since the driven member 24 is rollingly supported with respect to the base member and the rolling members 25, 26, 27, and 28 without any slippage generated, even when the driven member 24 has been pushed in a direction of the base member by the pressing member 21, the transfer resistance is reduced. Moreover, even when the driven member 24 is vibrating upon receiving drive of the vibrator 22, since the rolling members 25, 26, 27, and 28 support without being slipped with respect to the base member and the driven member 24, the wearing out can also be reduced. Moreover, since such rollingly supporting structure is disposed at a position not right under the driven member 24 but at a position shifted toward a side, the dimension in the direction of height can be made small, and the ultrasonic motor can be structured to be small-sized as an ultrasonic motor having the driven member and the rollingly supporting structure capsuled.

Figure 16:
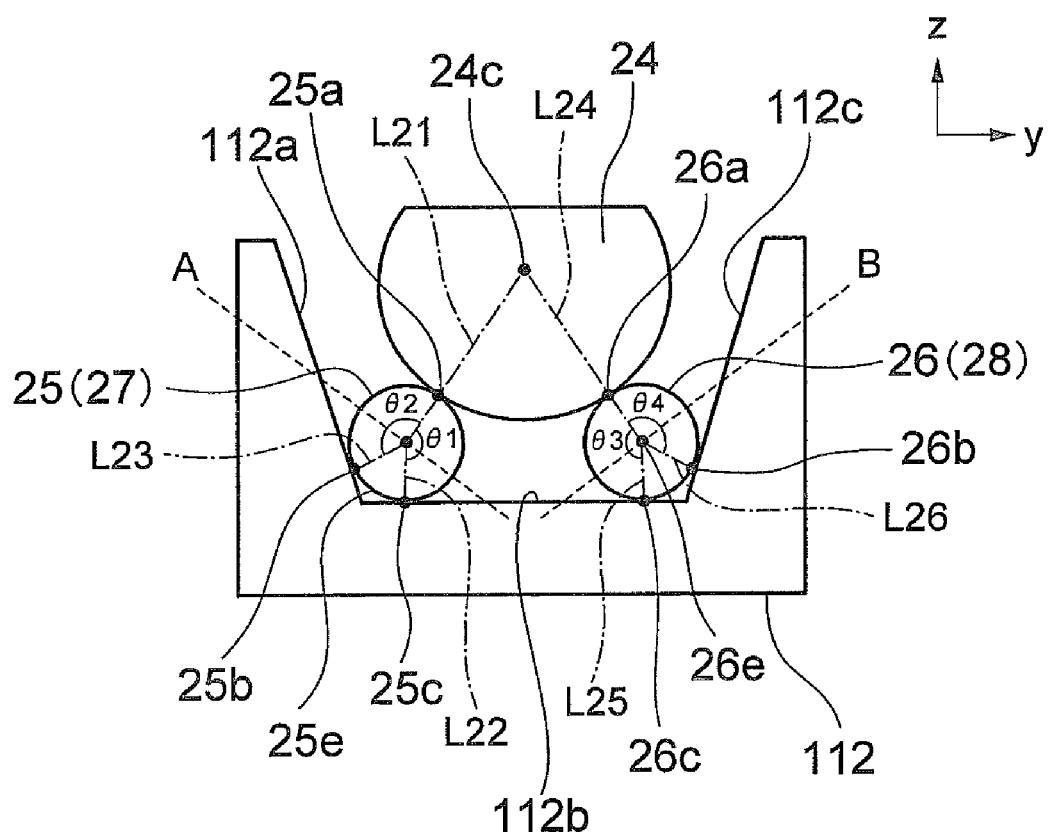
FIG. 16 is a cross-sectional view orthogonal to a center in a longitudinal direction of a base member of the ultrasonic motor according to the first modified embodiment of the first embodiment.
Figure 17:
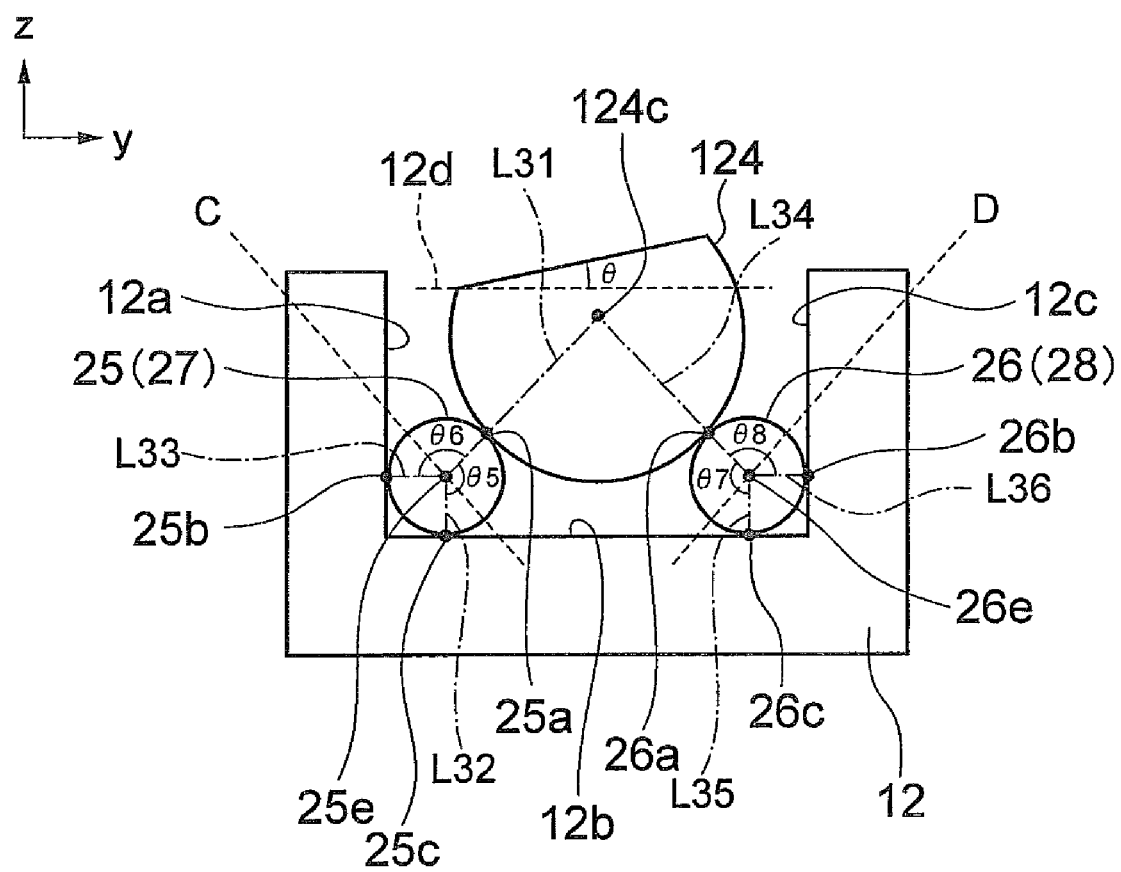
FIG. 17 is a cross-sectional view orthogonal to the center in the longitudinal direction of the base member of the ultrasonic motor according to the second modified embodiment of the first embodiment.

In the description made above, although the lengths of the two straight lines connecting the contact point of the rolling member and the driven member, and the two contact points of the base member and the rolling member are focused as a target, a peculiarity of the present invention can also be described by an angle. Here, the description will be made by taking the first modified embodiment and the second modified embodiment of the first embodiment as examples. FIG. 16 is a cross-sectional view orthogonal to a center of a longitudinal direction (direction (x-direction orthogonal to y-direction and z-direction) of the base member 112 of the ultrasonic motor according to the first modified embodiment of the first embodiment, and is a diagram showing a positional relationship of the driven member 24, the base member 112, and the rolling members 25, 26, 27, and 28. FIG. 17 is a cross-sectional view orthogonal to the center in the longitudinal direction (x-direction) of the base member 12 of the ultrasonic motor according to the second modified embodiment of the first embodiment, and is a diagram showing a positional relationship of the driven member 124, the base member 12, and the rolling members 25, 26, 27, and 28.

In the first modified embodiment of the first embodiment shown in FIG. 16, a straight line L21 connecting the contact point 25a of the driven member 24 and the rolling member 25, and a center 25e of the rolling member 25 makes an angle $\theta1$ with a straight line L22 connecting the contact point 25c of the bottom surface 112b of the base member 112 and the rolling member 25, and the center 25e of the rolling member 25. On the other hand, the straight line L21 makes an angle $\theta2$ with a straight line L23 connecting the contact point 25b of the side surface 112a of the base member 112 and the rolling member 25, and the center 25e of the rolling member 25, and a positional relationship of the driven member 24, the base member 112, and the rolling member 25 is set to be such that the angle $\theta2$ is equal to the angle $\theta1$. By having set the angles in such a manner, the rolling member 25 receives a drive from the driven member 24. Accordingly, the rolling member 25 makes an attempt to rotate around an axis A which passes through the center 25e of the rolling member, and which is perpendicular to the straight line L21.

Similarly, a straight line L24 connecting the contact point 26a of the driven member 24 and the rolling member 26, and a center 26e of the rolling member 26 makes an angle $\theta3$ with a straight line L25 connecting the contact point 26c of the bottom surface 112b of the base member 112 and the rolling member 26, and the center 26e of the rolling member 26. On the other hand, the straight line L24 makes an angle $\theta4$ with a straight line L26 connecting the contact point 26b of the side surface 112a of the base member 112 and the rolling member 26, and the center 26e of the rolling member 26, and a positional relationship of the driven member 24, the base member 112, and the rolling member 26 is set to be such that the angle $\theta4$ is equal to the angle $\theta3$. By having set the angles in such a manner, the rolling member 26 receives a drive from the driven member 24. Accordingly, the rolling member 26 makes an attempt to rotate around an axis B which passes through the center 26e of the rolling member 26, and which is perpendicular to the straight line L24.

In the second modified embodiment of the first embodiment shown in FIG. 17, a straight line L31 connecting the contact point 25a of the driven member 124 and the rolling member 25, and the center 25e of the rolling member 25 makes an angle $\theta5$ with a straight line L32 connecting the contact point 25c of the bottom surface 12b of the base member 12 and the rolling member 25, and the center 25e of the rolling member 25. On the other hand, the straight line L31 makes an angle $\theta6$ with a straight line L33 connecting the contact point 25b of the side surface 12a of the base member 12 and the rolling member 25, and the center 25e of the rolling member 25, and a positional relationship of the driven member 124, the base member 12, and the rolling member 25 is set to be such that the angle θ6 is equal to the angle θ5. By having set the angles in such a manner, the rolling member 25 receives a drive from the driven member 124. Accordingly, the rolling member 25 makes an attempt to rotate around an axis D which passes through the center 25e of the rolling member 25, and which is perpendicular to the straight line L31.

Similarly, a straight line L34 connecting the contact point 26a of the driven member 124 and the rolling member 26, and the center 26e of the rolling member 26 makes an angle θ7 with a straight line L35 connecting the contact point 26c of the bottom surface 12b of the base member 12 and the rolling member 26, and the center 26e of the rolling member 26. On the other hand, the straight line L34 makes an angle θ8 with a straight line L36 connecting the contact point 26b of the side surface 12a of the base member 12 and the rolling member 26, and the center 26e of the rolling member 26, and a positional relationship of the driven member 124, the base member 12, and the rolling member 26 is set to be such that the angle θ8 is equal to the angle θ7. By having set the angles in such a manner, the rolling member 26 receives a drive from the driven member 124. Accordingly, the rolling member 26 makes an attempt to rotate around an axis D which passes through the center 26e of the rolling member 26, and which is perpendicular to the straight line L34.

INDUSTRIAL APPLICABILITY

As it has been described above, the linear drive ultrasonic motor according to the present invention is appropriate for a highly accurate drive of a small-size equipment.

The invention claimed is:

1. A linear drive ultrasonic motor comprising at least:
an ultrasonic vibrator having a piezoelectric element;
a driven member which is driven by a frictional force between the driven member and the ultrasonic vibrator;
a pressing member which presses the ultrasonic vibrator such that, a frictional force is generated between the ultrasonic vibrator and the driven member;
a rolling member having a spherical shape, which makes a contact with the driven member; and
a base member which movably supports the driven member via the rolling member; wherein
the rolling member makes a contact with the driven member at a first contact point, and makes a contact with the base member at two second contact points, and
lengths of two straight lines connecting the first contact point and two second contact points are substantially same.

2. The linear drive ultrasonic motor according to claim 1, wherein the driven member has a curved surface within a range in which, at least the first contact point exists.

3. The linear drive ultrasonic motor according to claim 1, wherein the rolling member is disposed at a position which is not exactly under the driven member.

4. The linear drive ultrasonic motor according to claim 1, comprising:
a guiding member which includes a plurality of rolling members, and which guides the rolling members in a direction in which the driven member is driven, while maintaining a relative positional relationship of the rolling members.

5. The linear drive ultrasonic motor according to claim 4, wherein a protruding portion which is lower than a radius of the rolling member is provided at a bottom surface of the base member.

6. The linear drive ultrasonic motor according to claim 1, wherein a base guiding mechanism which includes a plurality of rolling members, and which guides the rolling members in a direction in which, the driven member is driven, while maintaining a relative positional relationship of the rolling members, is provided to the base member.

7. The linear drive ultrasonic motor according to claim 1, wherein the base member has a flat surface corresponding independently to each of the two second contact points, toward the rolling member.

8. The linear drive ultrasonic motor according to claim 7, wherein in the base member, an angle made by adjacent flat surfaces is a right angle.

9. The linear drive ultrasonic motor according to claim 7, wherein in the base member, an angle made by adjacent flat surfaces is an obtuse angle.

* * * * *